(12) United States Patent
Jack et al.

(10) Patent No.: US 7,064,469 B2
(45) Date of Patent: Jun. 20, 2006

(54) CORE BACK OF AN ELECTRICAL MACHINE AND METHOD FOR MAKING THE SAME

(75) Inventors: Alan Jack, Northumberland (GB); Barry Mecrow, Tine and Wear (GB); Philip George Dickinson, Northumberland (GB); Mats Persson, Höganäs (SE); Chris Manning, Gateshead (GB)

(73) Assignee: Höganäs AB, Höganäs (SE)

( * ) Notice: Subject to any disclaimer, the term of this patent is extended or adjusted under 35 U.S.C. 154(b) by 78 days.

(21) Appl. No.: 10/823,749

(22) Filed: Apr. 14, 2004

(65) Prior Publication Data

US 2004/0212267 A1    Oct. 28, 2004

(30) Foreign Application Priority Data

Apr. 15, 2003    (SE) .................................... 0301116

(51) Int. Cl.
  H02K 1/00    (2006.01)
  H02K 1/12    (2006.01)
  H02K 1/22    (2006.01)
(52) U.S. Cl. ...................... 310/216; 310/217; 310/218; 310/267; 310/268
(58) Field of Classification Search ................ 310/216, 310/217, 254, 261, 218, 267, 268
See application file for complete search history.

(56) References Cited

U.S. PATENT DOCUMENTS

| 4,365,180 A | * | 12/1982 | Licata et al. ................ 310/216 |
| 5,986,377 A | * | 11/1999 | Yamada et al. ............. 310/216 |
| 6,121,711 A | * | 9/2000 | Nakahara et al. ........... 310/254 |
| 6,362,544 B1 | * | 3/2002 | Johnston et al. .............. 310/44 |
| 6,566,778 B1 | * | 5/2003 | Hasegawa et al. .......... 310/211 |
| 6,741,005 B1 | * | 5/2004 | Vohlgemuth ................ 310/216 |
| 6,759,785 B1 | * | 7/2004 | Miyake et al. .............. 310/254 |
| 6,784,587 B1 | * | 8/2004 | Miyake et al. .............. 310/216 |
| 6,856,064 B1 | * | 2/2005 | Masumoto et al. ......... 310/216 |
| 2003/0127938 A1 | * | 7/2003 | Shen et al. .................. 310/216 |
| 2003/0201687 A1 | * | 10/2003 | Asai ........................... 310/214 |
| 2005/0073213 A1 | * | 4/2005 | Naito et al. ................. 310/218 |

FOREIGN PATENT DOCUMENTS

| JP | 363224638 | * | 3/1987 | ................ 310/259 |
| JP | 363174531 | * | 7/1988 | ................ 310/259 |
| JP | 10-271716 | | 10/1998 | |
| WO | WO 00/72426 | | 11/2000 | |

* cited by examiner

Primary Examiner—Tran Nguyen
(74) Attorney, Agent, or Firm—Buchanan Ingersoll PC

(57) ABSTRACT

An essentially ring shaped core back for an electrical machine comprising a plurality of stacked, ring shaped sheets of soft magnetic material, a barrier of electrical resistance arranged between two adjacent sheets of soft magnetic material for reducing effects of eddy currents. At least each sheet of soft magnetic material in a subset of said plurality of stacked, ring shaped sheets of soft magnetic material includes a plurality of circumferentially arranged tooth openings that are extending axially through each sheet in said subset of said plurality of stacked, ring shaped sheets of soft magnetic material, additionally, each sheet of said subset of said plurality of stacked, ring shaped sheets of soft magnetic material includes a first inner closing portion and a second inner closing portion that are arranged between each tooth opening and an inner perimeter of said ring shaped sheet of soft magnetic material. Each first inner closing portion is arranged to face a corresponding second inner closing portion.

7 Claims, 4 Drawing Sheets

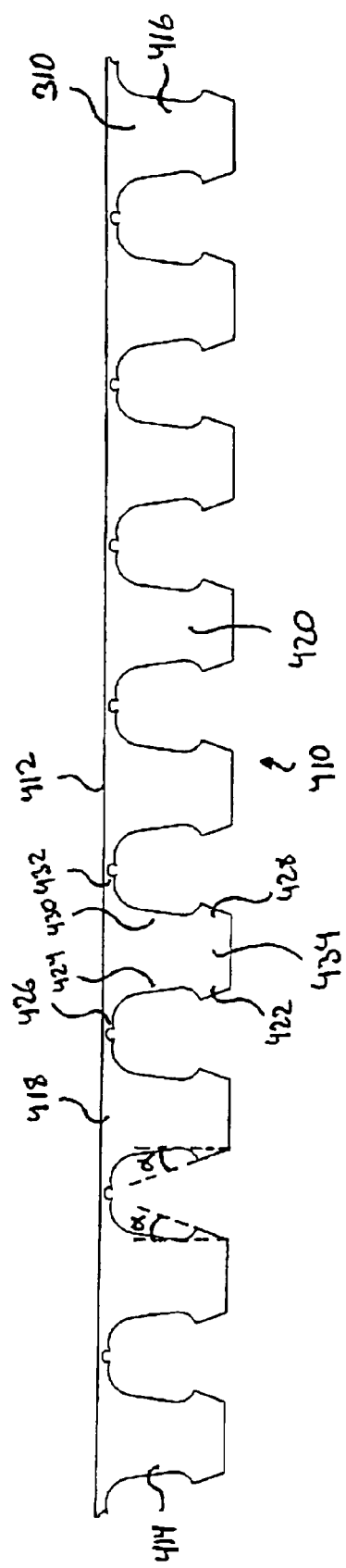

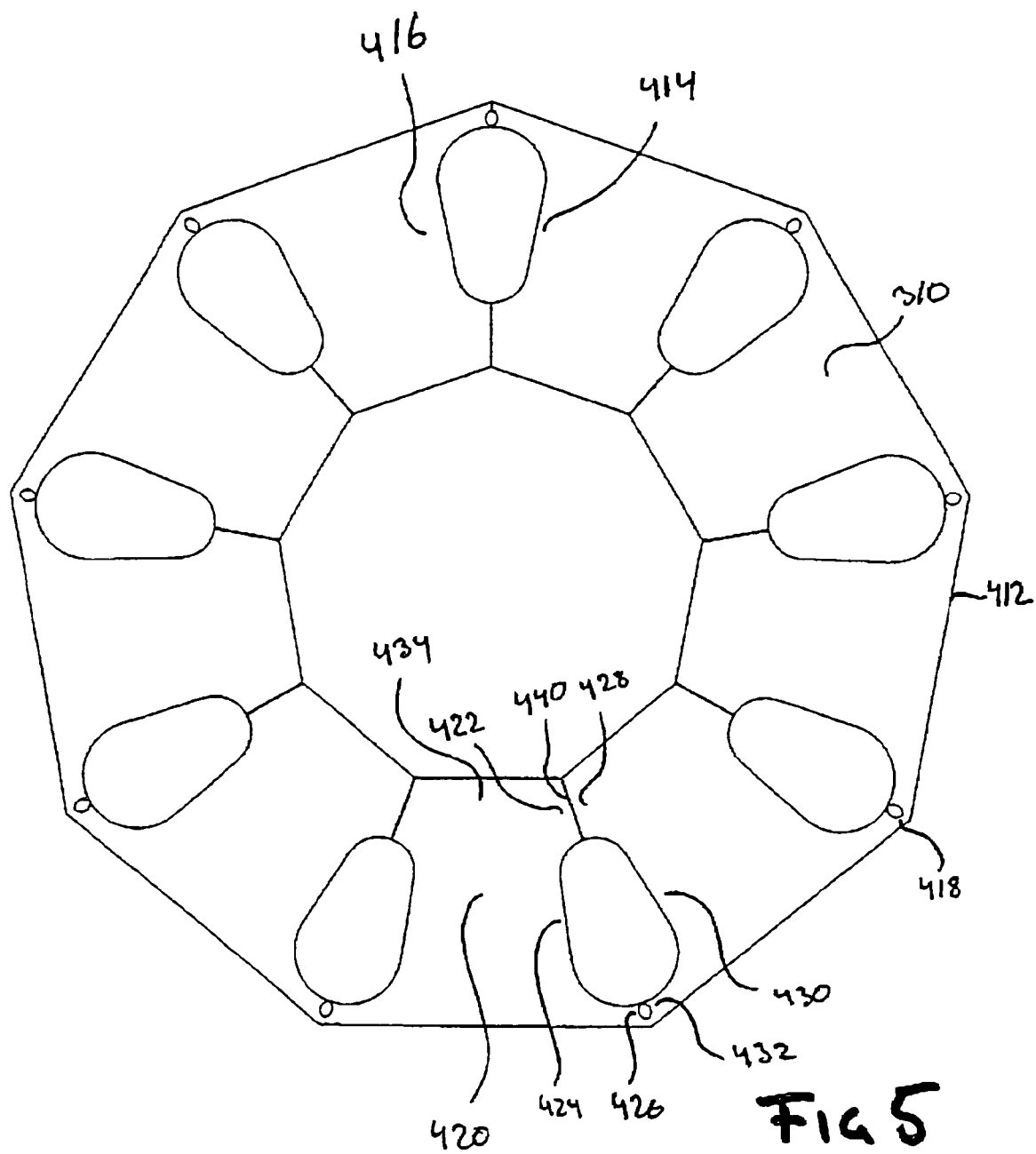

CORE BACK OF AN ELECTRICAL MACHINE AND METHOD FOR MAKING THE SAME

TECHNICAL FIELD OF THE INVENTION

The present invention is generally related to electrical machines and in particular to a core and the core back of an electrical machine. The present invention is also related to a method for making a core back of an electrical axial flux machine and a blank for making said core back.

BACKGROUND OF THE INVENTION

The stator or the rotor of electrical machines generally comprises teeth and a core back. The function of the teeth is to lead magnetic flux induced in the teeth by a coil arranged round the teeth and, thus, the teeth increases the efficiency of the interaction between the stator and a rotor, in respect of a stator or a rotor having no teeth. The core back is arranged to magnetically connect the teeth to each other in order to provide a flux feedback loop having low reluctance, i.e. it may be seen as closing the magnetic circuit generating flux for interaction with a rotor.

The stator cores of electrical machines have generally been made of solid soft magnetic material, e.g. iron. One problem with these types of stator cores is that eddy currents are induced in the stator core. To reduce this problem with eddy currents the stator cores of today are made of sheets of soft magnetic material that is stacked together and electrically insulated from each other or of iron powder being electrically insulated.

In U.S. Pat. No. 6,445,105 there is shown an axial flux machine having a core back made of laminations to which teeth of molded iron are attached and directed in an axial direction.

SUMMARY OF THE INVENTION

It is an object of the present invention to provide an improved core back for an axial flux machine.

This object is accomplished by means of a core back according to claim 1, by means of a core according to claim 2, by means of a method for making a core back according to claim 6, by means of a blank for making a core back according to claim 11. Preferred embodiments of the invention are disclosed in the dependent claims.

In particular, according to one aspect of the invention, a core back for an electrical axial flux machine, said core back being essentially ring shaped, comprises:

a plurality of stacked, ring shaped sheets of soft magnetic material, a barrier of electrical resistance arranged between two adjacent sheets of soft magnetic material for reducing effects of eddy currents, wherein each sheet of soft magnetic material in at least a subset of said plurality of stacked, ring shaped sheets of soft magnetic material includes a plurality of circumferentially arranged tooth openings, each tooth opening being at least partially defined by a first tooth engaging portion and a second tooth engaging portion, said tooth openings are extending in a direction substantially parallel with an axial direction of said core back through each said sheets, additionally, each sheet of said subset of said plurality of stacked, ring shaped sheets of soft magnetic material includes a first inner closing portion and a second inner closing portion which are arranged between each tooth opening and an inner perimeter of said ring shaped sheet of soft magnetic material, wherein each first inner closing portion is arranged to face a corresponding second inner closing portion.

According to another aspect of the invention, a core for an electrical axial flux machine, said core being essentially ring shaped, comprises:

a plurality of stacked, ring shaped sheets of soft magnetic material, a barrier of electrical resistance arranged between two adjacent sheets of soft magnetic material for reducing effects of eddy currents, wherein each sheet of soft magnetic material in at least a subset of said plurality of stacked, ring shaped sheets of soft magnetic material includes a plurality of first tooth engaging portions and a plurality of second tooth engaging portions, a first tooth engaging portion and a second tooth engaging portion being arranged to at least partially define a tooth opening, and wherein each sheet of soft magnetic material in at least a subset of said plurality of stacked, ring shaped sheets of soft magnetic material further includes a plurality of first outer closing portions and a plurality of second outer closing portions, a first outer closing portion and a second outer closing portion being arranged to face each other between an outer perimeter of said sheet of soft magnetic material and said tooth opening, and wherein said plurality of teeth are made of soft magnetic material and each tooth of said plurality of teeth is arranged in a tooth opening and is extending from said coreback in a direction essentially parallel with an axial direction of said coreback.

According to yet another aspect of the invention, a method for making a core back for an electrical machine comprises the acts of:

forming, from a initial sheet of soft magnetic material, at least one blank comprising a longitudinal coupling strip, a plurality of protrusions extending essentially orthogonal from said coupling strip, wherein each protrusion includes at least one tooth engagement portion and at least one inner closing portion, and bending the at least one blank in the plane of the blank moving said at least one inner closing portion of a protrusion towards an inner closing portion of an adjacent protrusion.

According to yet another aspect of the invention, a blank for making a core back of an electrical machine comprises:

a longitudinal coupling strip, and a plurality of essentially equidistantly arranged protrusions extending essentially orthogonal from said coupling strip, wherein each protrusion includes at least one tooth engagement portion and at least one inner closing portion.

By providing sheets of soft magnetic material with a first closing portion and a second closing portion at each tooth opening, which are defined by the tooth engaging portions, and making them face each other in the core back it is possible to make each ring shaped sheet of soft magnetic material that is provided with tooth openings by bending a elongated sheet of soft magnetic material into a ring shape. Accordingly, the amount of waste material resulting from the forming of sheets of soft magnetic material, i.e. the blanks, from initial sheets of soft magnetic material may be reduced.

Further, by bending the sheets of soft magnetic material to their final shape it becomes possible to clamp the teeth in between adjacent protrusions.

In the context of this invention ring shaped are not to be limited to circular rings only, but are to include ring shapes such as, triangular rings, quadrangular rings, pentagonal rings, etc., as well.

In the context of the invention the axial direction is a direction essentially orthogonal to the plane of the ring shaped sheet of soft magnetic material.

A further scope of applicability of the present invention will become apparent from the detailed description given below. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

Other features and advantages of the present invention will become apparent from the following detailed description of a presently preferred embodiment, with reference to the accompanying drawings, in which:

FIG. 4 is a schematic view of a blank for making a core back according to FIG. 3, and FIG. 5 is a schematic view of a blank according to FIG. 4, said blank is Bent into a ring shaped sheet of soft magnetic material that may be used to make an axial flux machine according to FIG. 1 or a core back according to FIG. 3.

DETAILED DESCRIPTION OF EMBODIMENTS

Figure 1:
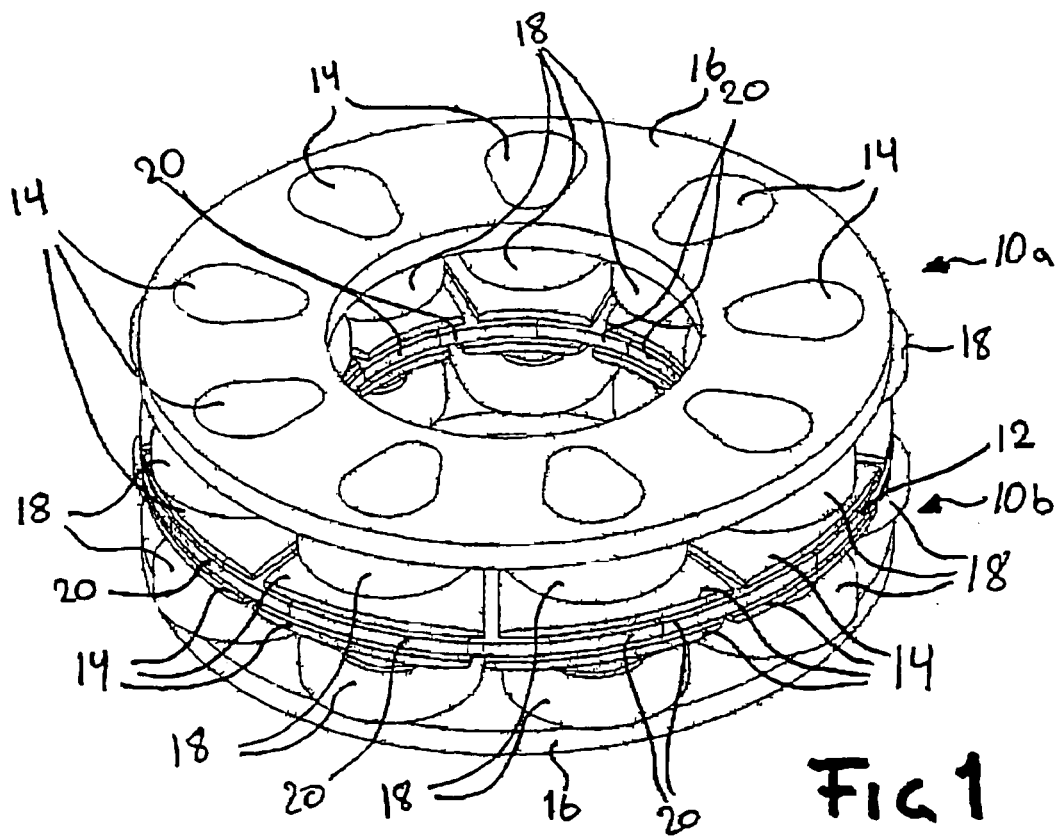
FIG. 1 is a schematic view of an axial flux electrical machine that may be arranged according to the invention.
Figure 2:
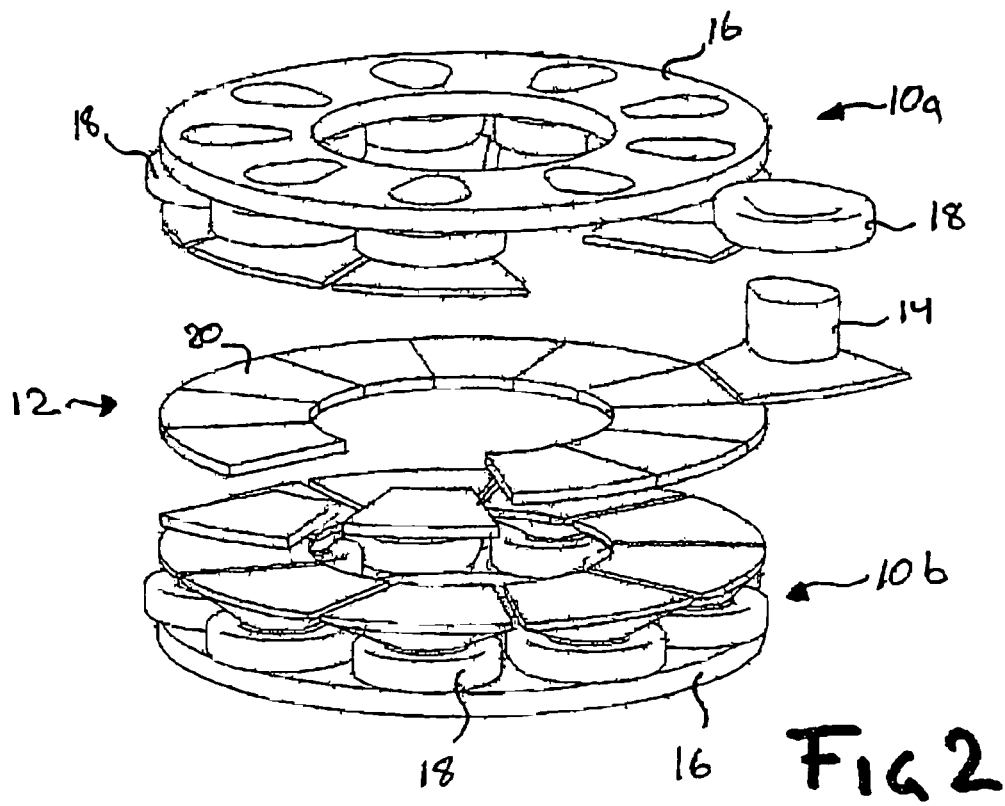
FIG. 2 is a schematic exploded diagram of the axial flux electrical machine of FIG. 1.

In FIGS. 1 and 2 there is shown stators 10a, 10b and a rotor 12 of an axial flux electrical machine having a double stator configuration. Accordingly, the axial flux machine includes two essentially identical stators 10a, 10b.

Each stator of the axial flux machine of FIG. 1 includes a plurality of teeth 14 attached to a core back 16, also known as yoke, and each tooth 14 is provided with a coil 18. The teeth 14 are circumferentially and essentially equidistantly arranged to said core back 16 and are extending in a direction substantially parallel with, an axial direction of said core back. The number of teeth 14 in a stator 10 may vary depending on the application and/or required characteristics of the machine. Each coil 18 may be a single winding, i.e. one wire wound into a coil and connected to an electrical supply unit, not shown, or a distributed winding, i.e. each coil 18 includes wires that are connected to different outputs of the supply unit and may thereby carry electricity having differing electrical characteristics. A person skilled in the art of electrical motors know many different types of electrical supply units which may be utilized. The skilled person also knows how to connect a single winding or a distributed winding to such electrical supply units. Further, the coils 18 may be pre-wound prior to being positioned around the teeth. The teeth 14 provided with a coil 18 may be attached to the core back 10a, 10b and, thus, the coils 18 do not need to be wound onto teeth 14 already attached to a core back 10a, 10b. This arrangement also makes it possible to use bobbin wound coils 18.

The rotor 12 of the axial flux machine in FIG. 1 includes a plurality of permanent magnet sections 20 arranged circumferentially having their polarization vectors directed in an axial direction. Every other permanent magnet section 20 may have a polarization vector that is directed in the opposite direction in relation to the two neighboring permanent magnet sections 20. The number of permanent magnet sections may vary depending on the application and/or required characteristics of the machine. Further, the permanent magnet sections 20 may be mounted onto some kind of support body, not shown.

An axial flux machine in which the present invention may be used may be an axial flux machine corresponding to the above described. However, it may also be an axial flux machine having a single stator configuration, an axial machine wherein the rotor includes a core back provided with teeth in accordance with the above description and wherein the stator includes permanent magnets, etc.

Figure 3:
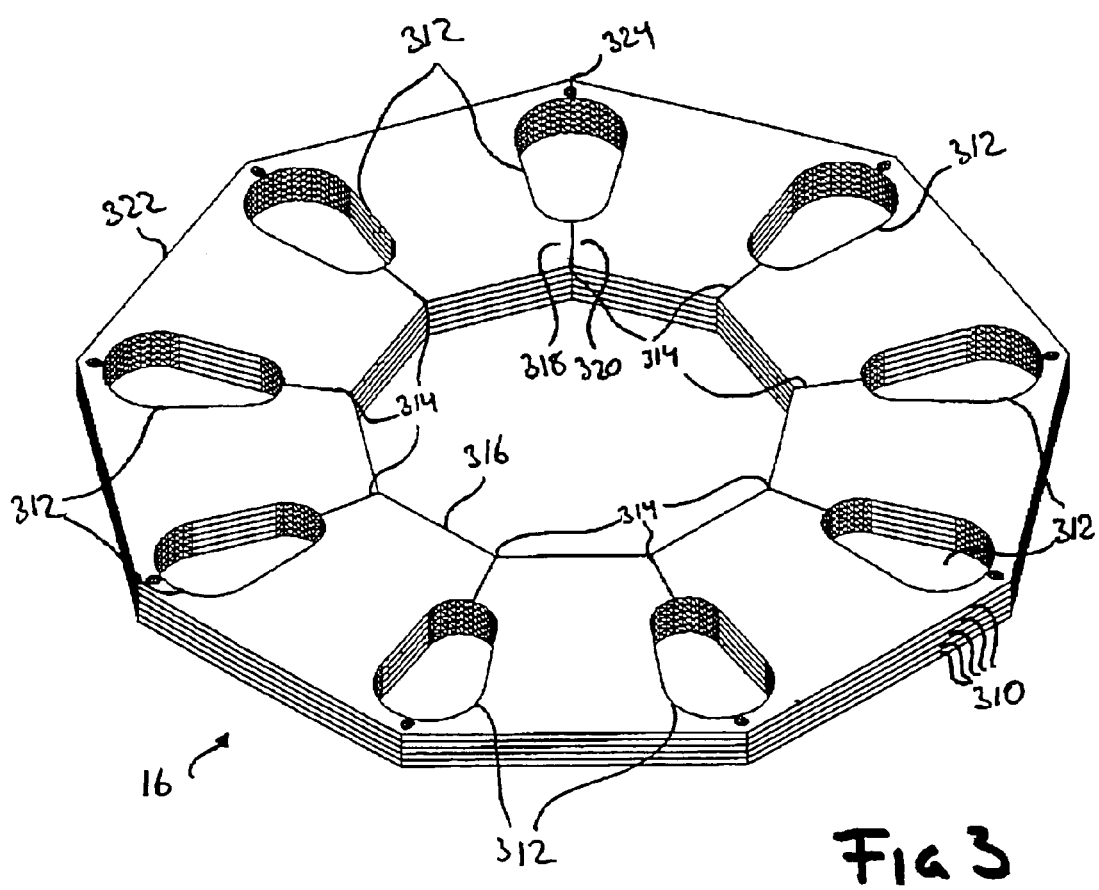
FIG. 3 is a schematic view of a core back according to the invention.

In FIG. 3 there is shown a core back 16 according to the invention. The core back 16 comprises a plurality of sheets 310 of soft magnetic material stacked onto each other. Further, there are tooth openings 312 in the core back for receiving the teeth, which are separate elements from the stator core 16, as shown in FIGS. 1–2. These tooth openings 312 may extent through the entire core back 16 or partially through the core back 16 in the axial direction.

The teeth that are to be attached to the core back 16, also see FIGS. 1 and 2, may be made of soft magnetic material provided with electrical resistance in order to reduce the appearance of eddy currents in the teeth. According to one embodiment the material used may be electrically insulated soft magnetic powder, soft magnetic powder presenting electrical resistance, or a moldable soft magnetic material presenting electrical resistance. When using electrically insulated soft magnetic powder, soft magnetic powder presenting electrical resistance, or a moldable soft magnetic material presenting electrical resistance, the manufactured stator parts, according to one embodiment, should present a resistivity of at least 1 $\mu\Omega m$ in order to reduce the appearance of eddy currents satisfactorily. Another advantage of using electrically insulated soft magnetic powder, soft magnetic powder presenting electrical resistance, or a moldable soft magnetic material presenting electrical resistance is that the teeth may be formed into almost any shape and that the teeth may provide three dimensional flux propagation, which may be desirable for some applications. Further, the shape of the teeth in an area where a coil is to be positioned may be formed so that the coil may bear against the teeth without risking to damage the insulation of the wires that form the coils.

In the core back 16 the magnetic flux propagates essentially circumferentially and, thus, inducing a current, i.e. eddy current, in the core back 16. In order to reduce the effect of eddy currents barrier of electrical resistance is arranged between adjacent sheets. This barrier may be achieved by providing a separate sheet of electrically insulating material between adjacent sheets 310 of soft magnetic material or by using sheets of soft magnetic material that are provided with a thin layer of insulation or other resistive compounds.

From each tooth opening to the inner perimeter 316 of each sheet 312 of soft magnetic material there is a dividing line 314, hereinafter called inner dividing line 314, which is a result of each sheet 310 of soft magnetic material being divided along this line. At one side of the inner dividing line 314 the portion between the tooth opening 312 and the inner perimeter 316 is called first inner closing portion 318 and on the other side of the inner dividing line 314 the area between the tooth opening 312 and the inner perimeter 316 is called second inner closing portion 320. The first and second inner closing portions 318 and 320 are arranged facing each other, thus, resulting in the inner dividing line 314. The inner closing portions are preferably not in contact with the tooth. Further, in the area between each tooth and the outer perimeter 322 there may be arranged another divisional line 324, hereinafter called outer dividing line 324.

One possible benefit of arranging the core back in this way is that the amount of waste material from making the core back 16 may be reduced. Below, one possible method for making a core back reducing the amount of waste material is presented.

In FIG. 4 a blank 410 for one sheet 310 of soft magnetic material used when making said core back according to one embodiment is showed. The blank 410 may be cut out, punched out, or formed by means of other known methods from an initial sheet of soft magnetic material, not shown.

The resulting blank 410 may include an elongated continuous run of soft magnetic material extending along a first longitudinal essentially linear side 412 of said blank 410, i.e. from a first end portion 414 to a second end portion 416 of the blank, this continuous run is hereinafter called coupling strip 418. Along the coupling strip 418 a plurality of essentially equidistant protrusions 420 extends essentially perpendicular to said first longitudinal side 412. According to the embodiment shown in FIG. 4, the number of protrusions 420 correspond to the number of desired tooth openings in the finished core back. However, this is a result of the end portions 414, 416 of the blank being full size protrusions, if the end portions is partial protrusions the number of protrusions may need to be increased by one.

Each full size protrusion 420 includes a first inner closing portion 422, a first tooth engaging portion 424, a first outer closing portion 426, a second inner closing portion 428, a second tooth engaging portion 430, and a second outer closing portion 432. Said first and second inner closing portions 422, 428 are included in a top portion 434 of the protrusion 420.

The first and second tooth engaging portions 423 and 430 may be arc shaped in order to be provide a close fit around a tooth having a rounded cross section. However, they may have any other shape as long as the connection between teeth and core back 16 is enable to transfer magnetic flux without unacceptable losses in flux. The top portion may be shaped essentially as a truncated triangle, in which the first and second inner closing portions 422 and 428 each form one of the tapering edges of said truncated triangle. The angle α of the tapering edge of the first and second inner closing portions 422 and 428 depends on the number of tooth openings in the resulting ring shaped core back and, thus, also the number of teeth in the final core. The angle is measured between an imaginary line being orthogonal to said first longitudinal side 412 of the blank 410 and the tapering edge of the first or the second inner closing portions 422, 428.

The first and second outer closing portions 426, 432 are defining a small slot which is arranged to facilitate the bending of the blank 410. The first and second outer closing portions 426, 432 may not be necessary if the bending may be accomplished without them. Regardless of outer closing portions or not, the geometrical properties and/or the properties of the soft magnetic material of the blank are to result in a blank 410, i.e. a formed sheet of soft magnetic material, that is flexible in a direction within the plane of the blank 410.

When the blank has been formed then the blank 410 is bent in the plane of the blank 410 into a ring shape so that the first and second end portions 414, 416 are facing each other, see FIG. 5. During the bending the first and second inner closing portions 422 and 428 of two adjacent protrusions 420 are moved towards each other, and when the blank 410 has been bent enough each first inner closing portion 422 is facing a second inner closing portion 428 resulting in the inner dividing line 440 as shown in FIG. 5 and in FIG. 3. The first and second inner closing portions 422, 428 may be arranged in close contact to each other in order to provide a low reluctance path for the flux over the dividing line 440.

However, in some applications it may be sufficient to have a low reluctance path via a tooth arranged in said tooth opening. In such case the first and second inner closing portions 422, 428 may not necessarily be arranged in close contact with each other, they may even not be in contact with each other at all. According to one embodiment the tolerances of the protrusions 420 may be dimensioned in such a way that the bending of the blank results in that the teeth that are to be attached to the core back are clamped by the first and second tooth engagement portions 424, 430 of two adjacent protrusions 420. This may be accomplished by designing the tooth engagement portions 424, 430 so that they are defining a tooth opening that is marginally smaller in a circumferential direction than the width of the teeth, thus the teeth is clamped when the teeth is mounted and the blanks 410 is bent.

The first end portion 414 of the bent blank 410, forming the ring shaped sheet of soft magnetic material, may be attached to the second end portion 416. They may be attached to each other by means of soldering, welding, gluing or any other way known to a person skilled in the art.

Now referring to FIG. 3, in order to make a core back according to one aspect of the invention a plurality of ring shaped sheets 310 of soft magnetic material that have been processed as the one described above is stacked on top of each other. As mentioned earlier, the sheets 310 of soft magnetic material either includes an electrically insulating layer or there is provided insulation between the different sheets 310. The core back may then be provided with teeth and coils. According to one embodiment the teeth are provided with coils and then the teeth are attached to the core back, as shown in FIG. 2 wherein a coil 18 is arranged on a tooth 14 and then the tooth 14 is attached to the core back 10a, 10b.

According to another aspect of the invention, the plurality of blanks are formed from a stack of initial sheets of soft magnetic material, i.e. a plurality of blanks in a stack are produced simultaneously.

According to yet another aspect of the invention, independently of whether the blanks are formed from a stack of initial sheets of soft magnetic material or from single initial sheets of soft magnetic material, teeth and coils may be arranged in the tooth openings of a stack of processed sheets of soft magnetic material that have not yet been bent, i.e. blanks. Then the stack of sheets of soft magnetic material is bent to a complete ring shaped stator or rotor. When using this embodiment the teeth may be clamped by the first and second tooth engaging portions of the sheet of soft magnetic material.

The invention claimed is:

1. Core for an axial flow electrical machine comprising a substantially ring shaped coreback and a plurality of teeth, wherein said coreback includes:
   a plurality of stacked, ring shaped sheets of soft magnetic material and
   a barrier of electrical resistance arranged between two adjacent sheets of soft magnetic material for reducing effects of eddy currents,
   wherein each sheet of soft magnetic material in at least a subset of said plurality of stacked, ring shaped sheets of soft magnetic material includes a plurality of first tooth engaging portions and a plurality of second tooth engaging portions, a first tooth engaging portion and a second tooth engaging portion being arranged to at least partially define a tooth opening, and wherein each sheet of soft magnetic material in at least a subset of said plurality of stacked, ring shaped sheets of soft magnetic material further includes a plurality of first outer closing portions and a plurality of second outer closing portions, a first outer closing portion and a second outer closing portion being arranged to face each other between an outer perimeter of said sheet of soft magnetic material and said tooth opening, and wherein said plurality of teeth are made of soft magnetic material and each tooth of said plurality of teeth is arranged in a tooth opening and is extending from said coreback in a direction essentially parallel with an axial direction of said coreback.

2. Core according to claim 1, wherein each sheet of soft magnetic material comprised in said subset of said plurality of stacked, ring shaped sheets of soft magnetic material further includes a first end portion and a second end portion which are facing each other.

3. Core according to claim 2, wherein said first end portion and said second end portion are attached to each other.

4. Core according to claim 1, wherein said subset of said plurality of stacked, ring shaped sheets of soft magnetic material include all ring shaped sheets of soft magnetic material in the core.

5. Core according to claim 1 wherein said subset of said plurality of stacked, ring shaped sheets of soft magnetic material include all ring shaped sheets of soft magnetic material in the core.

6. Core according to claim 2 wherein said subset of said plurality of stacked, ring shaped sheets of soft magnetic material include all ring shaped sheets of soft magnetic material in the core.

7. Core according to claim 3 wherein said subset of said plurality of stacked, ring shaped sheets of soft magnetic material include all ring shaped sheets of soft magnetic material in the core.

* * * * *